(12) United States Patent
Toyosato

(10) Patent No.: US 6,532,482 B1
(45) Date of Patent: *Mar. 11, 2003

(54) MOBILE COMPUTER WITH AUDIO INTERRUPT SYSTEM

(75) Inventor: Kazuyucki Toyosato, Yokohama (JP)

(73) Assignee: Xybernaut Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/461,870

(22) Filed: Dec. 15, 1999

Related U.S. Application Data

(63) Continuation-in-part of application No. 09/160,849, filed on Sep. 25, 1998, now Pat. No. 6,301,593.

(51) Int. Cl.[7] .................................................. G06F 3/00
(52) U.S. Cl. ...................................... 708/131; 708/141
(58) Field of Search ............................... 708/131, 141; 235/472.1–172.3

(56) References Cited

U.S. PATENT DOCUMENTS

| 4,677,569 | A |   | 6/1987  | Nakano et al.     |
|-----------|---|---|---------|-------------------|
| 5,305,244 | A | * | 4/1994  | Newman et al.     |
| 5,698,834 | A | * | 12/1997 | Worthington et al.|
| 5,844,824 | A | * | 12/1998 | Newman et al.     |
| 6,301,593 | B1|   | 10/2001 | Toyosato          |

FOREIGN PATENT DOCUMENTS

| JP | 4138512  | 5/1992  |
| JP | 5022779  | 1/1993  |
| JP | 07016388 | 3/1995  |
| JP | 7134628  | 5/1995  |
| JP | 8115142  | 5/1996  |
| JP | 8211961  | 8/1996  |
| JP | 10319991 | 12/1998 |
| JP | 11065592 | 3/1999  |
| JP | 11296673 | 10/1999 |

* cited by examiner

Primary Examiner—Tan V. Mai
(74) Attorney, Agent, or Firm—James J. Ralabate

(57) ABSTRACT

This is a compartment that provides for increased protection of PCMCIA cards when used in computers. The compartment is covered by a movable door which can be moved to accommodate various size PCMCIA cards with various type projections. Since the entire horizontal portion of a PCMCIA card will seat in the compartment, a firm support is provided for the entire card.

16 Claims, 1 Drawing Sheet

MOBILE COMPUTER WITH AUDIO INTERRUPT SYSTEM

CROSS REFERENCES TO RELATED APPLICATIONS

This application is a Continuation in Part of U.S. patent application Ser. No. 09/160,849 filed Sep. 25, 1998 now U.S. Pat. No. 6,301,593 B1 issued Oct. 9, 2001 entitled "Mobile Computer with Audio Interrupt System."

INVENTION

This invention relates to a mobile body supported computers and more specifically to a system for reducing the temperature in a body-worn computer.

BACKGROUND OF THE INVENTION

In U.S. Pat. No. 5,305,244 (Newman et al I), a novel body-worn computer voice activated computer is disclosed which is completely supported by a user for hands-free retrieval and display of information. The computing apparatus includes a voice-recognition module, in communication with a processor, for receiving audio commands from the user, for converting the received audio commands into electrical signals, for recognizing the converted electrical signals and for sending the recognized electrical signals to the processor for processing, the voice-recognition module being supported by the user. The computing apparatus further includes a display in communication with the processor for receiving information from the processor and for displaying the received information for the user, the display being supported by the user whereby the user may operate the computing apparatus to display information in a hands-free manner utilizing only audio commands.

The computing apparatus described in U.S. Pat. No. 5,305,244 includes a housing having securing means for removably securing the housing to a user for support by the user. The housing further includes storage means for storing previously entered information, and processor means, communicating with the storage means, for receiving, retrieving and processing information and user commands in accordance with a stored program The computing apparatus also include audio transducer and converter means, in communication with the processor means, for receiving audio commands from the user, for converting the received audio commands into electrical signals, for recognizing the converted electrical signals, and for sending the recognized electrical signals to the processor means, the audio transducer and converter means also being supported by the user. The computing apparatus further includes display means in communication with the processor means for receiving information from the processor means and for displaying the received information for the user, the display means being supported by the user whereby the user may operate the computing apparatus to display information in a hands-free manner utilizing only audio commands.

In a copending U.S. application Ser. No. 08/861,598 filed on May 22, 1997, a hands-free portable computer system similar to that in U.S. Pat. No. 5,305,244 (Newman et al. II) is described; however, various activation means other than voice activation are disclosed. The invention disclosed in Newman et al II is directed to a compact, portable computing apparatus at least part of which is completely supported by a user for hands-free retrieval and display of information for the user. The computing apparatus includes a housing which may or may not have securing means for removably securing the housing to a user for support by the user. Alternatively, the housing may be located in a remote location not attached to the user and apart from the other components. The housing further includes storage means for storing previously entered information, and processor means, communicating with the storage means, for receiving, retrieving, and processing information and user commands in accordance with a stored program. Since large databases of ETMs and IETMs will be accessed by the mobile self-contained computing apparatus, a means of easily interfacing storage means containing the databases is required—The housing of the computing apparatus includes an access port whereby various storage means containing data can be interfaced and communication established. Access and transfer of data between the storage means and the computing apparatus can be accomplished entirely under control of various hands-free activation means described in this application. The access port allows direct electrical attachment of the storage means; however, other wired and wireless connections are also used. The computing apparatus also includes eye tracking, brain actuation means, transducer and converter means with or without audio transducer and converter means in communication with the processor means, for receiving commands from the user, for converting the received commands into electrical signals, for recognizing the converted electrical signals, and for sending the recognized electrical signals to the processor means. The transducer and converter means may or may not be supported by the user. The computing apparatus further includes display means in communication with the processor means for receiving information from the processor means and for displaying the received information for the user, the display means being supported by the user whereby the user may operate the computing apparatus to display information in a hands-free manner utilizing only brain activation or eye tracking with or without audio commands.

In addition to the voice activation means used in Newman et al I as noted earlier, these two other above-noted activation means have been contemplated by the present invention, i.e. eye tracking and brain-activation means (EEG). This invention uses the same general system described in Newman et al I.

In a second co-pending U.S. application Ser. No. 09/092, 261 (Toyosato) a body-worn mobile computer is disclosed which comprises a computer housing having a heat insulating surface which fits adjacent a user's body, and heat conducting top and side surfaces which dissipates heat from the internal portion of the housing to the atmosphere. This is to remedy a problem uniquely faced by mobile body-worn computers; that is heat generated by the CPU and conducted to the housing could cause a major problem to wearers. The problems faced with body-worn computers are completely different than those of desk top or laptop computers. Attempts to remedy this heat problem is body-worn computers have led to highly insulate components or housings, but these efforts have resulted in larger and heavier computers; a situation just opposite to the desired goal of smaller and lighter body-worn units. Toyosato also uses heat sinks together with selected materials to alleviate the heat problems in body-worn computers. The disclosures of co-pending applications Ser. Nos. 08/861,598 and 09/092, 261 are incorporated by reference into the present disclosure. Other references that deal with heat problems in computers are U.S. Pat. No. 5,559,675 (Hsiek et al), U.S. Pat. No. 5,287,292 Kenny et al, U.S. Pat. No. 5,452,434 (MacDonald) and U.S. Pat. No. 4,980,836 (Carter et al). All of these prior art patents disclose ways for reducing power and heat to desk top computers by the user of mouses or keyboards. As noted earlier, the problems in desk top computers and their solutions do not equate to problems in wearable computers. For one thing, a wearable computer discussed herein are hands-free, whereas desk top or lap top computers require the use of hands. None of the prior art patents noted above teach how hands-free computers can be powered down to reduce heat and power without the use of hands.

In U.S. Pat. No. 5,606,341 (Aguilera) a laptop computer having CPU cooling means is disclosed. In this laptop computer, CPU-generated heat is thermally conducted passively to a radiator-like element disposed behind the LCD, which uses the heat to warm the LCD. The CPU is surrounded by a liquid-tight housing containing a bi-phase coolant. A first tube in fluid communication with an outlet port in the housing conveys heat-vaporized coolant to an input port on the radiator. The coolant flows through a plurality of columns formed in the radiator-like element, transferring heat and condensing in the process. The transferred heat is radiated to the LCD, which is desirably warmed in the process. The condensed coolant is conducted from an export port in the radiator-like element through a second tube to an input port in the housing. A pressure sensor may be included to provide a coolant pressure drop signal that can be used to shutdown the CPU in the event of a coolant leak.

In Aguilera a heat dissipating coolant is deposited or disposed adjacent a rear surface of the LCD. Then the CPU is surrounded with a coolant-containing chamber, whereby heat generated by the CPU is carried by a conductor to a coolant. Aguilera uses a radiator type system to maintain the temperature at a workable level and to control the heat generated by the CPU. Obviously, the weight of the radiator and the use of chemical coolants make Aguilera's system undesirable for use in body-worn computers.

In laptop or mobile environments, battery life is one of the more important features to users. Power management is implemented in a variety of ways, but the most common is done through either overt (manual or physical) changes to the system or covert (through the modification of BIOS or operating system settings) or a combination of both. In situations where the laptop is powered down through overt actions—when the use closes the laptop lid or screen—the system will interpret this as an indication that the user is, for the time being, completing any work and will not be using the laptop to perform any other functions. When this occurs, the system will, without any other intervention on the part of the user, place the laptop in a powered-down or sleep state. When a computer is in this state, the laptop will have reduced the power or eliminated it completely from all non-critical components. Those components include monitor, floppy, CD-ROM, hard drive, etc. For convenience laptop computer manufacturers have implemented a simple button that a user can hit to immediately place the computer in a sleep or suspend mode. To "wake up" or reactivate a computer in sleep or suspend mode, all that the user needs to do is move the mouse or key a key on the keyboard. Another way to reduce battery consumption or place the laptop in sleep or suspend mode is to "program" the operating software to monitor the use of the computer and to place the computer in sleep or suspend mode when certain conditions are met. These conditions are: no activity on the computer to a certain amount of time (settable by the user), inactivity of a certain (programmable) duration will cause the hard disk to power down, inactivity of the video display for a certain duration will cause the back light and video display to go blank, etc. These situations are caused by the operating system but allows the user to program when and under what circumstances the peripherals power down. Again, to reactivate a certain peripheral, all the user needs to do is to cause the computer to request an operation by that peripheral (e.g. a task that requires an application to access the hard drive will cause the hard drive to reactivate itself).

In all of the above mentioned situations, the user is required to provide an overt manual action in order for the system to become fully operational. This usually takes the form of hitting a keystroke or moving the mouse. There is no prior art that suggests a power control system for use in hands-free body worn computers.

SUMMARY OF THE INVENTION

It is therefore an object of this invention to provide a practical heat and power control system for use in body-worn computers devoid of the above-noted disadvantages.

Another object of this invention is to provide a hands-free method for powering down a body-worn computer.

A further object of this invention is to provide a body-worn computer that has extended power life and reduced heat generation.

Yet a further object of this invention is to provide a method for reducing the heat generated by the CPU of a hands-free body-worn computer.

Still a further object of this invention is to provide a simple, practical and efficient method for controlling the heat and power generation of a body-worn computer.

Another yet further object of this invention is to provide an audio means for controlling heat and power in a hands-free body-worn computer and reduce the heat in contact with a user's body.

These and other objects of this invention are accomplished generally speaking by a voice recognition module which controls the power and heat in the body-worn computer.

The computer further includes audio transducer and converter means in communication with the system unit for receiving audio commands from the user, for converting the receiver audio commands into electrical signals and for sending the recognized electrical signals to a processor within the system unit. In the present embodiment, the audio transducer and converter means includes a microphone for receiving verbal commands from the operator. The microphone which in the present embodiment, is electrically connected to the system unit via a cable is preferably an ear-supported microphone, although those with ordinary skill in the art will appreciate that any audio-input or transducer device could be used and that the audio input or transducer could be supported by the user at some other location such as proximate the mouth or throat of the user. The computer system used in the present invention is disclosed in detail in U.S. Pat. No. 5,305,244 and U.S. Ser. No. 08/861,598, both of which are herein incorporated by reference in their entireties.

The computing apparatus described in U.S. Pat. Nos. 5,305,244; 5,844,824 and in the present invention includes a computer housing having securing means for removably securing the housing to a user for support by the user. The housing further includes storage means for storing previously entered information, and processor means, communicating with the storage means, for receiving, retrieving and processing information and user commands in accordance with a stored program. The computing apparatus also includes audio transducer and converter means, in communication with the processor means, for receiving audio commands from the user, for converting the received audio commands into electrical signals, for recognizing the converted electrical signals, and for sending the recognized electrical signals to the processor means, the audio transducer and converter means also being supported by the user. The computing apparatus further includes display means in communication with the processor means for receiving information from the processor means and for displaying the received information for the user, the display means being supported by the user whereby the user may operate the computing apparatus to display information in a hands-free manner utilizing only audio commands. The display means of the present invention includes any well known display such as those disclosed in U.S. Pat. Nos. 5,305,244 and 5,844,824.

In the present invention a lightweight display is used including a head-mounted display, a flat panel display, a wrist display, a display on the aforementioned housing, a torso-worn display, a neck-hung display, a lapel-worn display, a shoulder-supported display or others or mixtures thereof. Also, any display connected to a lanyard around the user's body may be used. Each display could be wireless connected or hard wired connected to the processor means.

For example, an application program could interact with an independent (or dependent) voice-recognition module in order to cause the voice-recognition module in to recognize a verbal utterance against a subset of an entire trained vocabulary model. The vocabulary subset could include, for example, the words in the speech recognition module that correspond to the operating system commands to power down the CPU. The heat/power can be controlled by key words in the vocabulary sub-set. In contrast, dependent voice-recognition modules cannot be integrated with application programs. Systems and methods for voice recognition, and particularly for independent voice recognition, are described in U.S. Pat. Nos. 5,025,471, 4,969,193 and 4,672,667, both of which are herein incorporated by reference in their entireties.

When the body-worn computer is not operational, the computer should be powered down to conserve the limited power of the battery. Since the computer is hands-free, there is no mouse or keyboard to use to power down. Also, no body-worn computer known has any practical means to conserve the battery power and lower the heat that will be conveyed to the body of a user. It is extremely important in body-worn computers to A conserve energy because of the limited power provided by the battery; and B. to lower the heat generated by the computer since the computer will be in constant contact with the body of a user.

A computer system is comprised of a CPU (central processing unit), a chip set (IC for controlling the system), an audio process IC, a video output control IC, and the like. Here, the audio process IC processes such that audio data composed and processed in digital manner is converted in analog format and creates from the converted data sound that can be listened to with the human ear. Also the audio process converts analog sound generated externally into digital signals and processes it such that it becomes in a processable state at the CPU.

The chip set arbitrates the CPU and functional IC, such as audio process IC and video output control IC, while it controls the operation speed of CPU from the view point of decreasing electric power consumed and controlling temperature increase at CPU.

For the decrease of electric power consumed, when there are no inputs from external input devices, such as keyboard and mouse, the operation speed of the CPU is described and the electric power consumed is minimized. Once there are inputs from any external input devices, the operation speed of the CPU is increased to perform processes quickly.

For controlling the temperature increase at the CPU, when the temperature at the CPU and its surroundings increases, the operation speed of the CPU is decreased to control the generation of heat from the CPU.

Normally, because audio inputs are not considered as an external input device like keyboard or mouse, there are effects to the control of the operation speed of the CPU. That is, when audio is input externally and the CPU tries to process it, the operation speed of the CPU is very low. Thus, when processes are not performed efficiently enough, the operation speed of the CPU cannot be increased.

Thus, in addition to a path for audio input, a circuit for detecting the existence of the audio input is provided. Then, by processing the output from the circuit at a chip set and controlling the operation speed of the CPU with the processed data, processing the audio data by CPU is performed smoothly.

First, a determination is made at a comparator as to whether the analog audio input is more than a predetermined level. Here, the predetermined level is set by components on the circuit, such as resistance. The result of the determination is carried to the chip set as interrupt signals. Then, the operation speed of the CPU is varied by the point of change in the interrupt signals as a trigger.

Since processing the audio data is not necessary when the output from the comparator is none, the control of the operation speed of the CPU is performed with external input devices and the temperature at the CPU. On the other hand, when there is output from the comparator, the operation speed of the CPU is maximized regardless of other causes. Furthermore, it is possible to most prioritize the process of the audio data if the CPU is processing multiple tasks in parallel.

DETAILED DESCRIPTION OF THE DRAWING AND PREFERRED EMBODIMENTS

Figure 1:
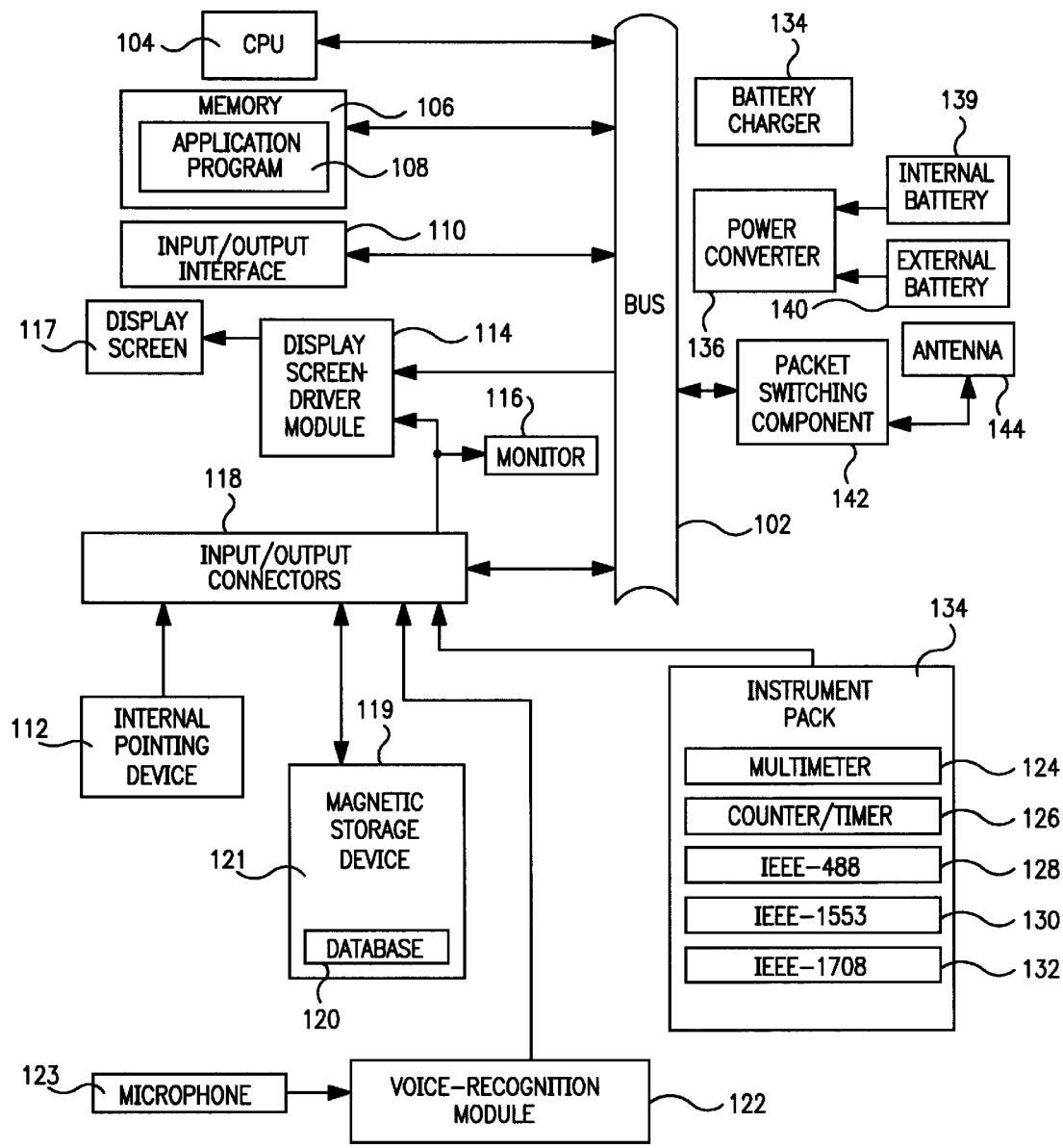
FIG. 1 is a schematic block diagram of an embodiment of this invention, illustrating the primary structural features of the computer system of this invention.

FIG. 1 is a schematic block diagram of the primary structural features of the computer in accordance with the present embodiment. The computer 102 includes a bus 102, which preferably has a data width of at least sixteen bits. According to the present embodiment, the bus 102 is contained in the system unit 106. The computer also includes processor means such as central processing unit (CPU) 104, which is connected to the bus 102 and is also preferably contained in the system unit. Preferably, the CPU 104 is an 80286 or 80386SX microprocessor available from Intel. It will be appreciated by those of ordinary skill in the art that while an 80286 or 80386SX microprocessor is preferred, any other central processor or microprocessor, either available presently or in the future, could be used.

The computer also includes a memory 106 having, for example, one Mbyte to twenty Mbytes of random access memory (RAM); however any amount of RAM is suitable. The memory 106, which is also connected to the bus 102 and is preferably contained in the system unit, stores an application program 108 while the computer is operating. The application program 108 may have been loaded into the memory 106 from a magnetic storage device 119 (described below) pursuant to operator instructions.

The computer also includes an input/output interface 110 which controls all data transfers between the CPU 104 and certain other components (herein called peripherals) which communicate with the CPU 104 but which are not connected directly to the bus 102. Preferably, the input/output interface 110 includes a video interface, a controller for at least two RS-232 compatible serial ports, a controller for the centronics-compatible parallel port, keyboard and mouse controllers, a floppy disk controller, and a hard drive interface. However, it will be appreciated by those of ordinary skill in the art that the input/output interface 110 could include additional and/or different interfaces and controllers for use with other types of peripherals. The input/output interface 110 is connected to the bus 102 and preferably is located in the system unit. Element or component 114 is the graphics chip that drives the displays 116 and 117. These displays display information from the processor or chip 114. There is also in the system of this invention elements:

112 is an internal pointing device;

120 is the database for storing information;

121 is the non-volatile storage device;

123 is a microphone;

124–132 are all interfaces for test equipment or test equipment interfaces;

134 is a battery charger that charges batteries both internal battery 139 and external battery 140;

136 is a power converter that takes power input and converts it to a specific voltage to run the computer system;

142 is a packet switching component or communication means such as a cell phone, radio and the like;

144 is an antenna for communication device 142 for receiving signals from a transmitter.

Referring again to FIG. 1, the computer also includes various peripherals such as storing means, such as a magnetic storage device 119, measurement means such as instrument pack, a microphone and a voice-recognition module 122, which are all connected to the system unit (and, specifically, to the input/output interface 110 which controls data traffic between the peripherals and the CPU 104) via the input/output connectors 118. The voice recognition module 122 will contain means to recognize a voice command to power down.

The voice-recognition module 122 is preferably contained in the system unit and is connected to the microphone (which is preferably an ear microphone located outside of the system unit). Alternatively, the voice-recognition module 122 may be located outside of the system unit and, for example, may be incorporated with the microphone as a single unit. Alternatively, the analog-to-digital converter component of the voice-recognition module 122 is located outside of the system unit while the remaining components of the voice-recognition module 122 is located inside the system unit, the external analog-to-digital converter preferably communicating with the system unit via a serial communication stream. The microphone receives audio input (also called verbal utterances) from the operator, converts the audio input to electrical signals and digitizes the electrical signals. The voice-recognition module 122 recognizes the verbal utterances (which are in the form of digitized electrical signals) and transfers the recognized verbal utterances to the CPU 104 for processing according to the application program 108. Thus, a voice command to power down will reduce power and heat when desirable. Thus, just as a conventional keyboard driver interprets as characters and words the electrical signals which result from an operator typing on a conventional keyboard, the voice-recognition module 122 interprets (or recognizes) as characters and words the digitized electrical signals which result from an operator speaking near or into the microphone. Consequently, like conventional input devices such as keyboards and pointing devices, the voice-recognition module 122 in combination with the microphone provides a means for operators to interact with and control the operation of the computer.

Preferably, the voice-recognition module 122 operates according to well-known dependent voice recognition algorithms and is implemented in hardware of a type well known in the art. According to a preferred embodiment, the voice-recognition module 522 is a dependent voice recognition circuit card available from Voice Connection of Irving, Calif. However, those with ordinary skill in the art will appreciate that any dependent voice recognition circuit card having a size compatible with the size of the system unit 106 could be used.

Alternatively, the voice-recognition module 122 operates according to well-known independent voice recognition algorithms, the independent voice recognition algorithms representing an improvement over dependent voice recognition algorithms. Specifically, an independent voice-recognition module is able to recognize the voices of multiple speakers and includes "good listener", a learning feature for real time modification of a trained vocabulary model. In contrast, a dependent voice-recognition module can recognize only a single speaker's voice.

The preferred and optimumly preferred embodiments of the present invention have been described herein and shown in the accompanying drawings to illustrate the underlying principles of the invention, but it is to be understood that numerous modifications and ramifications may be made without departing from the spirit and scope of this invention.

What is claimed is:

1. A mobile body-worn computer and system comprising a housing, a microphone, power means, storage means, processor means, audio transducer and converter means, and a display means, said processor means containing a recognizing means, said housing having means for attachment to a body of a user, said audio transducer and converter means in communication with said processor means for receiving audio commands directly from said user via said microphone, said audio transducer and converter having means for converting audio commands into electrical signals to control power in the system including to power down said computer, and having means to send said electrical signals to the processor and other components of said computer to comply with said audio commands, said display means selected from the group consisting of head-mounted displays, flat panel displays, wrist-mounted displays, neck-hung displays, displays supported by lanyards attached to the user's body, and mixtures thereof.

2. The computer of claim 1 wherein said processor means is in communication with said storage means for receiving, retrieving, and processing information and user commands in accordance with a stored program.

3. The computer of claim 1 wherein said housing has securing means for being supported and carried hands-free by the user.

4. The computer of claim 1 wherein said storage means has means for storing previously entered information, including an electronic technical manual and a preprogrammed vocabulary model of a plurality of words, including preprogrammed commands to reduce power supplied to said processor means.

5. The computer of claim 1 wherein said computer display means is in communication with said processor means for receiving the outputted information from the processor means and for displaying any power reduction effectuated by the commands of the user.

6. The computer of claim 1 wherein said recognizing means contains a plurality of words and phrases in a preprogrammed vocabulary model, including a preprogrammed vocabulary to incrementally reduce power to said processor means, and for matching the converted electric signals against said preprogrammed vocabulary to recognize the command.

7. The computer of claim 1 wherein said power means supplies power to said computer and wherein a power output by said power means is controlled by audio commands.

8. The computer of claim 1 having means whereby said user can by voice commands control the heat generated and power supplied to the processor and said display means.

9. A body-worn, hands-free activated mobile computer and system comprising a computer housing, a microphone, power means, display means, storage means, processor means, audio transducer and converter means, and recognizing means, said housing containing means for attachment to a user's body and containing internally all components of said computer except for said display means, said processor in communication with said audio transducer and converter means and wherein said processor having means to accept audio commands directly from said user via said microphone, and convert said audio commands into electrical signals to control power through said computer, said audio transducer having means to send said converted audio commands to said processor and other components of said computer, said display means selected from the group consisting of head-mounted displays, flat panel displays, wrist-mounted displays, neck-hung displays, displays supported by lanyards attached to the user's body, and mixtures thereof.

10. The computer of claim 9 wherein said processor means is in communication with said storage means for receiving, retrieving, and processing information and user commands in accordance with a stored program.

11. The computer of claim 9 wherein said housing has securing means for being supported and carried hands-free by the user.

12. The computer of claim 9 wherein said storage means has means for storing previously entered information, including an electronic technical manual and a preprogrammed vocabulary model of a plurality of words, including preprogrammed commands to reduce power supplied to said processor means.

13. The computer of claim 9 wherein said computer display means is in communication with said processor means for receiving the outputted information from the processor means and for displaying any power reduction effectuated by the commands of the user.

14. The computer of claim 9 wherein said recognizing means contains a plurality of words and phrases in a preprogrammed vocabulary model, including a preprogrammed vocabulary to incrementally reduce power to said processor means, and for matching the converted electric signals against said preprogrammed vocabulary to recognize the command.

15. The computer of claim 9 wherein said power means supplies power to said computer and wherein a power output by said power means is controlled by audio commands.

16. The computer of claim 9 having means whereby said user can by voice commands control the heat generated and power supplied to the processor and said display means.

* * * * *

UNITED STATES PATENT AND TRADEMARK OFFICE
CERTIFICATE OF CORRECTION

PATENT NO.    : 6,532,482 B1
DATED         : March 11, 2003
INVENTOR(S)   : Toyosato It is certified that error appears in the above-identified patent and that said Letters Patent is hereby corrected as shown below:

<u>Title page,</u>
Item [57], ABSTRACT,
Please substitute the Abstract with the Abstract below.

-- A body supported computer is disclosed which has an audio related transducer and converter system used to power down the computer and to control the power output by audio commands. Various displays to be used with this computer are disclosed. --

Signed and Sealed this

Eighth Day of July, 2003

JAMES E. ROGAN
*Director of the United States Patent and Trademark Office*